June 27, 1950  E. P. TURNER  2,513,120
AIRPLANE AUTOMATIC PILOT
Filed Dec. 20, 1945  5 Sheets-Sheet 1

INVENTOR
Edgar P. Turner
BY
William P. Stewart
ATTORNEY

WITNESS
Godfrey Pecina

June 27, 1950 — E. P. TURNER — 2,513,120
AIRPLANE AUTOMATIC PILOT
Filed Dec. 20, 1945 — 5 Sheets-Sheet 3

Fig. 5.

INVENTOR
Edgar P. Turner
BY
William P. Stewart
ATTORNEY

WITNESS:
Godfrey Pecina

June 27, 1950 E. P. TURNER 2,513,120
AIRPLANE AUTOMATIC PILOT
Filed Dec. 20, 1945 5 Sheets-Sheet 4

Fig. 6.

INVENTOR.
Edgar P. Turner
BY
William P. Stewart
ATTORNEY

WITNESS:
Godfrey Pecina

June 27, 1950 E. P. TURNER 2,513,120
AIRPLANE AUTOMATIC PILOT
Filed Dec. 20, 1945 5 Sheets-Sheet 5

Fig. 7.

INVENTOR.
Edgar P. Turner
BY
William P. Stewart
ATTORNEY

WITNESS
Godfrey Pecina

Patented June 27, 1950

2,513,120

UNITED STATES PATENT OFFICE 2,513,120

AIRPLANE AUTOMATIC PILOT

Edgar P. Turner, Fanwood, N. J., assignor to The Singer Manufacturing Company, Elizabeth, N. J., a corporation of New Jersey Application December 20, 1945, Serial No. 636,238

7 Claims. (Cl. 244—77)

This invention relates to automatic pilots for aircraft.

The primary object of this invention is to provide an aircraft pilot apparatus comprising a single gyroscopic unit which is adapted to control automatically an airplane about all three axes of angular motion; namely, lateral, longitudinal, and directional. A further object of the invention is to provide an instrument of the above character which is adapted to receive signals from an outside source for the purpose of utilizing the instrument as a servo means whereby said signals may be effective to control the flight of an aircraft. A still further object of the invention is the elimination of the need for the high-precision manufacture required of certain elements of such instrument as heretofore constructed, but without loss of efficiency or accuracy of response.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings, which are somewhat diagrammatic.

Heretofore, it has been customary to employ two gyroscopic units for controlling automatically an aircraft about the three axes of angular movement. By three axes of angular movement, as applied to an aircraft, is meant the axes of yaw, pitch and roll. In order to control an aircraft about these respective axes, the usual aircraft is provided with a vertical rudder, a pair of elevators and a pair of ailerons. However, as is well known in the art, an aircraft may be properly controlled about these three axes by the use of the ailerons and elevators, without the use of the rudder or by elevators and rudder only. In the prior art instruments, it has been customary to employ a gyroscope having a vertical axis of spin for controlling the aircraft about its pitch and roll axes, and a second gyroscope having a horizontal axis of spin for controlling the aircraft about its vertical or yaw axis. Such systems have, of necessity, been expensive to build, and due to the fact that the two gyroscopic devices used in such systems operated entirely independent of each other, it was difficult to coordinate the actions of the two gyroscopes in the event that it was desired to adjust and control them for the purpose of altering the direction and attitude of the aircraft manually through the automatic pilot system.

In the present automatic pilot system, a single gyroscope is utilized to perform the same functions as were heretofore performed by the two gyroscopes, and thus not only is the cost of the present system appreciably less than that of the former, but it provides a single means whereby all the direction and attitude controlling members of the aircraft are interlocked or integrated.

In order to obviate the necessity of using both a vertical spin-axis and a horizontal spin-axis gyroscope, the present gyroscope has been designed to be sensitive to movements about all three axes of angular movement. More specifically, the spin-axis of the present gyro rotor is disposed in a vertical plane containing the pivotal axis of the inner gimbal ring and at about a 45 degree angle with the normal horizon. When the instrument is installed in an aircraft, the spin-axis lies in the plane of symmetry of the aircraft with the upper end of the axis tilted forwardly. The spin-axis will then be inclined to all three principal axes of the aircraft, and thus the gyroscope will be sensitive to movements of the aircraft about the three axes to the extent that the single gyroscope will be effective completely to control the airplane through the medium of, for example, the ailerons and elevators.

Figures 1, 2:
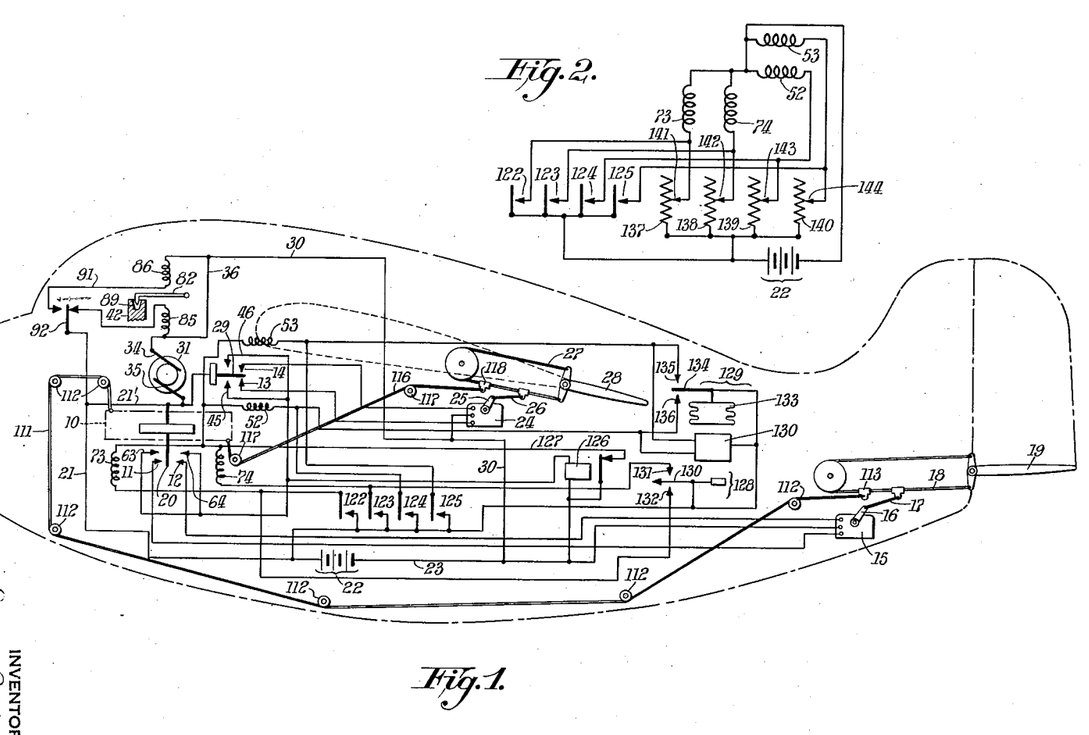
Fig. 1 is a schematic side view illustrating the general application of a preferred form of the invention to an aircraft, shown in dotted outline.
Fig. 2 is a schematic view of one modification of a portion of the wiring diagram shown in Fig. 1.

Referring now to the drawings, and first to Fig. 1, wherein a preferred form of the device is illustrated, the gyroscope itself, including its gimbal mounting and associated parts, are mounted within a frame 10 the gyro functioning to actuate the controls of the aircraft through appropriate power transmission means such as the electrical circuits shown in Fig. 1.

As shown, pick-off contacts 11 and 12 are associated with the elevator controls and pick-off contacts 13 and 14 with the aileron controls. Contacts 11 and 12 are connected by circuit leads to a reversible control or servo motor 15. The motor 15 operates, through crank 16 and link 17 secured to cable 18, to raise or lower the elevator 19 depending upon the direction of the rotation of the motor. Associated with contacts 11 and 12 is a third contact 20 which floats between contacts 11 and 12, the contact 20 being connected by leads 21 and 21' to one side of a 27 volt battery 22 which has its other side connected by a lead 23 to the motor 15. Engagement of the contact 20 with contact 11 results in operation of the motor 15 in a direction such that the elevator 19 will be lowered, and engagement of the contact 20 with the contact 12 results in operation of the motor in the opposite direction thereby to raise the elevator 19. When the contact 20 is out of engagement with both contacts 11 and 12, the motor 15 is stationary.

Contacts 13 and 14 are connected by circuit leads to a reversible control motor 24 which operates through crank 25 and link 26 secured to the cable 27 to raise or lower the aileron 28. It will be understood that the opposite or starboard wing of the aircraft carries a reversely operating aileron controlled through the same contacts 13 and 14. Associated with contacts 13 and 14 is a third contact 29 which floats between contacts 13 and 14, the contact 29 being connected by leads 21 and 21' to one side of the battery 22 which has its other side connected by a lead to the motor 24. Engagement of the contact 13 with contact 29 results in operation of the motor 24 in a direction such that the port aileron 28 will be raised and the starboard aileron (not shown) lowered, and engagement of the contact 29 with contact 14 results in operation of the motor 29 in the opposite direction thereby to lower the port aileron 28 and raise the starboard aileron.

As the above noted contacts are all associated with the gyroscopic unit, it will be understood from the foregoing that the function of the gyroscope in this preferred form is to effect the control of the relative positions of the contacts, and thereby, through the described circuits, the necessary adjustments of the elevator and ailerons.

Referring now to Figs. 3, 5, 6 and 7, the gyroscope includes a rotor 31 having a shaft 32 journaled for rotation within a rotor bearing case 33 which also houses a 27 volt motor for driving the shaft 32 and rotor 31 at a prerequisite speed. Fig. 1 discloses, diagrammatically, the motor brushes 34 and 35 which are connected to the battery 22. Brush 34 is connected to one side of the battery by leads 36 and 30, and brush 35 to the other side thereof by leads 21' and 21.

This bearing case 33 functions as an inner gimbal ring and it is pivotally mounted for rotation about an inclined axis defined by the trunnion members 37 and 38 carried by an outer gimbal ring 39, the latter element being pivotally mounted on the frame 10, as on trunnions 40 and 41, for rotation about a normally horizontal axis normal to the pivot axis of the inner gimbal ring or casing 33. Thus the rotor 31 is universally mounted within the frame 10.

Mounted upon the upper portion of the casing 33, (see Fig. 5) is a flat head-member 42 of insulating material to the under portion of which is secured the contact 29 for cooperation with pick-off contacts 13 and 14 which are secured by means of screws 43 and 44 to a projection 39' made of insulating material and carried by the outer gimbal ring 39. Cut-out contacts 45 and 46 are secured to the projection 39' by screw 47, and the function of these contacts will be hereinafter described.

Figure 5:
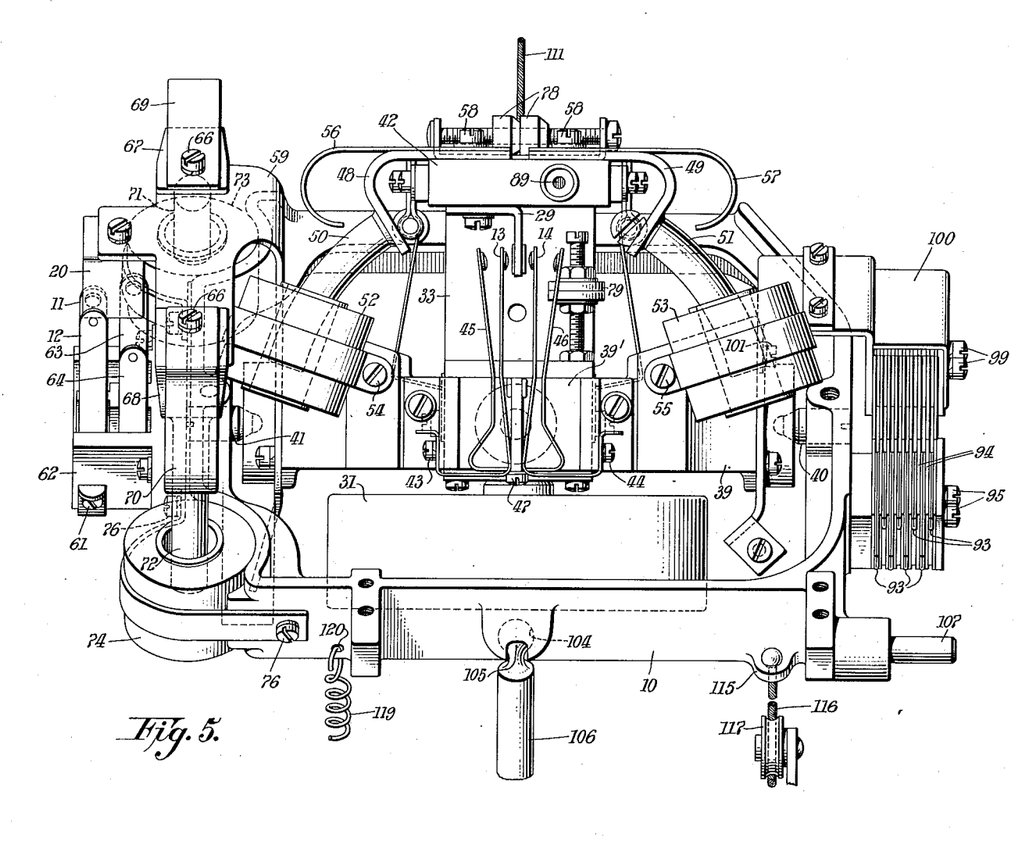
Fig. 5 represents a view of the instrument taken substantially along line 5—5 of Fig. 3 with the caging unit removed therefrom.
Figure 6:
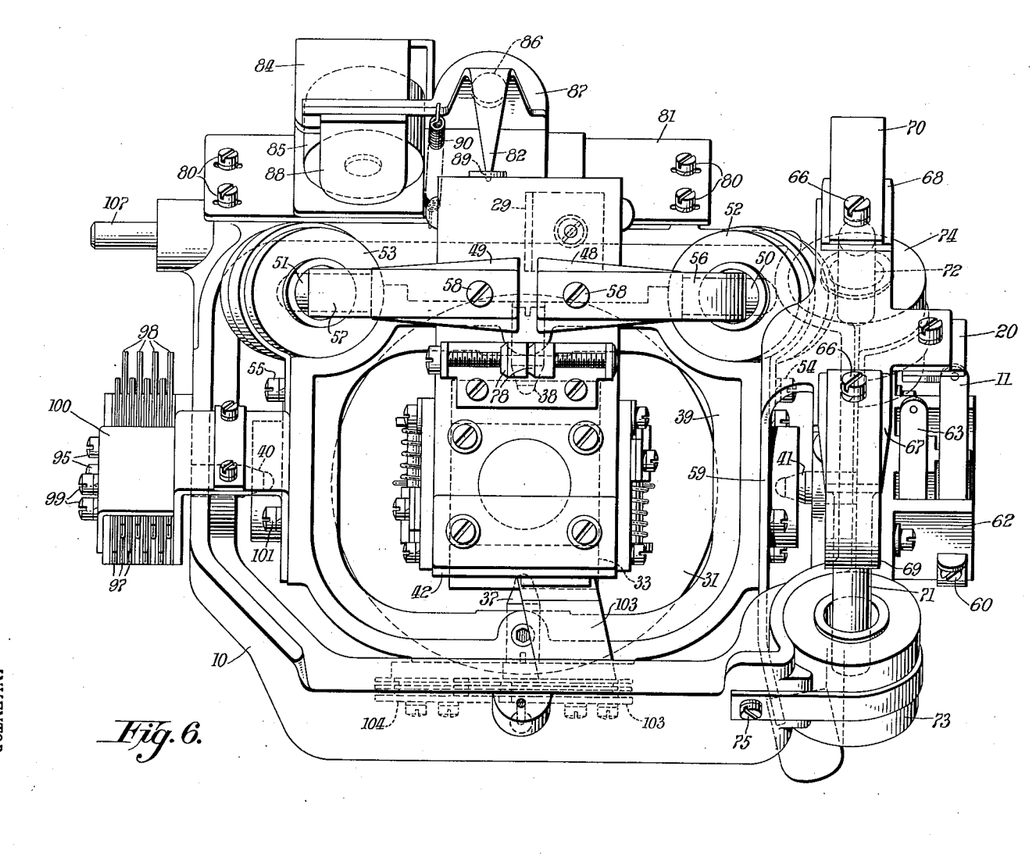
Fig. 6 represents a view of the instrument taken substantially along line 6—6 of Fig. 3.

Referring to Figs. 5 and 6, there is secured to the head-member 42 a pair of brackets 48 and 49 carrying the core members 50 and 51 of which each is adapted to be received within a respective one of the solenoid coils 52 and 53 secured upon the outer gimbal 39 by means of screws 54 and 55. Spring-stops 56 and 57, secured upon the head-member 42 by screws 58, prevent the cores 50 and 51 from entering the coils 52 and 53 beyond a predetermined point.

Projecting upwardly from one side of the outer gimbal ring 39 is an upstanding bracket 59 carrying at its upper portion the contact 20 which cooperates, as above described, with contacts 11 and 12 which are secured by means of screws 60 and 61 to a projection 62 which is formed on the frame 10 and made of insulating material. Cut-out contacts 63 and 64 are secured to the projection 62 by screw 65.

Screws 66, threaded into the bracket 59, carry the brackets 67 and 68 and stop-springs 69 and 70. Secured upon the brackets 67 and 68 are cores 71 and 72 which are received within the solenoid coils 73 and 74 which are secured to the frame 10 by means of screws 75 and 76.

Secured upon the downwardly projecting portion of the bracket 59 is a counterweight 77 which is adapted, along with the adjustable weights 78 and 79 carried by the casing 33, to place the inner gimbal ring or casing 33 in static balance.

Figures 3, 4:
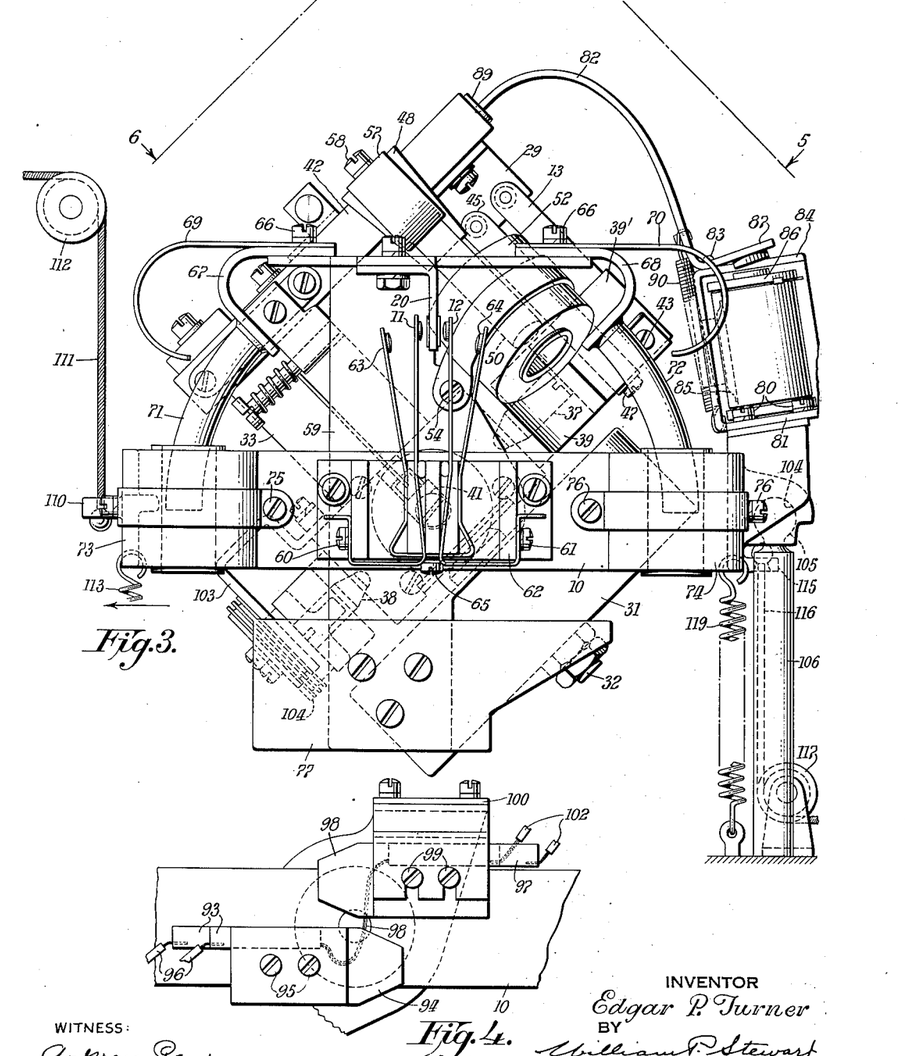
Fig. 3 represents a side elevation of the instrument.
Fig. 4 represents a side elevation, on an enlarged scale, of one pair of swivel leads.

From the foregoing it is to be understood that the spring pick-off contacts 11 and 12 normally are effective to sustain the outer gimbal ring 39 in the 45 degree position relative to the frame 10, and the pick-off contacts 13 and 14 are effective to hold the inner gimbal ring or casing 33 square with the outer gimbal ring 39. Means are also provided for locking the gyroscope in the position illustrated in the drawings. Referring particularly to Figs. 3 and 6, there is secured upon the outer frame 10, by means of screws 80, a bracket 81 which supports a caging device. This caging device comprises a pointed finger 82 pivoted by means of a pair of hinge pins 83 (only one shown herein) upon a bracket member 84 which projects upwardly from the base bracket 81. Provided in this caging device are a pair of magnetic coils 85 and 86 which are so disposed relative to a pair of ears 87 and 88, carried by finger 82, that they are effective to actuate the finger 82 back and forth, depending upon which one of the coils is energized. When coil 85 is energized, the finger 82 is moved downwardly into engagement with an aperture 89 provided in the member 42. A coil spring 90, having its upper end secured upon the finger 82 and its lower end anchored on bracket 84, functions to retain the finger 82 in this locked position when both coils are de-energized. Coil 86, when energized, is effective to raise the finger 82 clear of the aperture 89. Referring to Fig. 1 it is to be understood that coil 85 is connected to the battery 22 by means of leads 36, 30 and 21, and coil 86 is connected to the battery by means of leads 91, 21 and 30. A selector switch 92, under manual control, makes it possible for the human pilot to energize either coil at will.

In order to energize the rotor driving motor, the caging coils 85 and 86, coils 52, 53, 73 and 74, as well as the various pick-off contacts, the unit is provided with two pair of swivel leads. Referring particularly to Figs. 3, 4 and 5, the frame 10 has mounted thereon a stack of alternately spaced conductor tubes 93 and non-conducting baffles 94. Screws 95 secure the stack upon the frame 10. Fig. 4 illustrates how the conducting leads 96 from the battery 22 are inserted within the end portions of the tubes 93 which are connected to the corresponding tubes 97 by means of flexible pig tail leads 98. The tubes 97 are also insulated from each other by baffles 98 which, along with the tubes 97, are secured by screws 99 to a bracket 100 which in turn is mounted upon the outer gimbal ring 39 by a screw 101. Leads 102 conduct the electrical energy from the tubes 97 to the various elements hereinabove mentioned and the baffles 98 prevent the pig tail leads from engaging each other. A similar pair of swivel leads are respectively secured upon the casing 33 and the outer gimbal ring 39 as at 103 and 104, thus to conduct the proper electrical leads between the relatively movable members 33 and 39.

The instrument, as above described is adapted to be placed in an aircraft with the frame 10 mounted so as to lie in the normal horizontal plane with the spin-axis of the rotor lying in the vertical plane with its upper portion tilted forwardly, thereby forming substantially a 45 degree angle with the horizontal plane. It therefore will be understood that when the nose of the aircraft swings upward or downward from any predetermined course, the instrument, excepting only the inner and outer gimbal rings 33 and 39, partakes of a similar tilting movement; and the axis of the rotating gyro or rotor 31 maintaining its 45 degree position relative to the true horizontal, relative movement takes place between the contact 20 and the pick-off contacts 11 and 12. Engagement of contact 20 with either contact 11 or 12, will, through the circuits described, adjust the elevator 19, or any elevational controlling planes, in a direction to offset or correct the departure from course which initiated the described sequence of operations. When the aircraft again assumes its proper course, the engagement between contact 20 and either of the contacts 11 or 12 will be severed.

It will be observed that there is a zone of travel within which contact 20 may move without engaging contacts 11 and 12, and similarly for contact 29 relative to contacts 13 and 14. This zone of travel may be termed the null zone. The groups of contacts 20, 11 and 12, and 29, 13 and 14 each comprise a double-acting pick-off switch, inasmuch as each provides actuation in the event of movement out of the null zone in either direction.

Thus it is to be understood that the double-acting pick-off switches function to detect relative movement between the inner and outer gimbal rings and between the outer gimbal ring and the frame when said movement is beyond a predetermined amount.

When the aircraft rolls about its longitudinal axis, the gyro axis will again tend to remain fixed in space thereby providing relative movement between contact 29 and the contacts 13 and 14. Engagement of the contact 29 with either contact 13 or 14 will, through the circuits described, adjust the ailerons 28, or any azimuthal controlling planes, in a manner to offset or correct the rolling movement of the aircraft about its line of flight. Reorientation of the aircraft will disengage contact 29 from either contact 13 and 14.

Any yawing movement of the aircraft about a vertical axis will result primarily in bringing about a relative movement between contact 29 and one of the contacts 13 or 14, depending upon the direction of yaw. As in the case of rolling, a yawing movement will require a counter corrective adjustment of the ailerons or any azimuthal controlling planes which may include a rudder. Although the present system is provided with aileron and elevator control, it is contemplated that a vertical rudder could be substituted for the ailerons, depending upon the characteristics of the particular type of aircraft in which the system is to be used.

Figure 7:
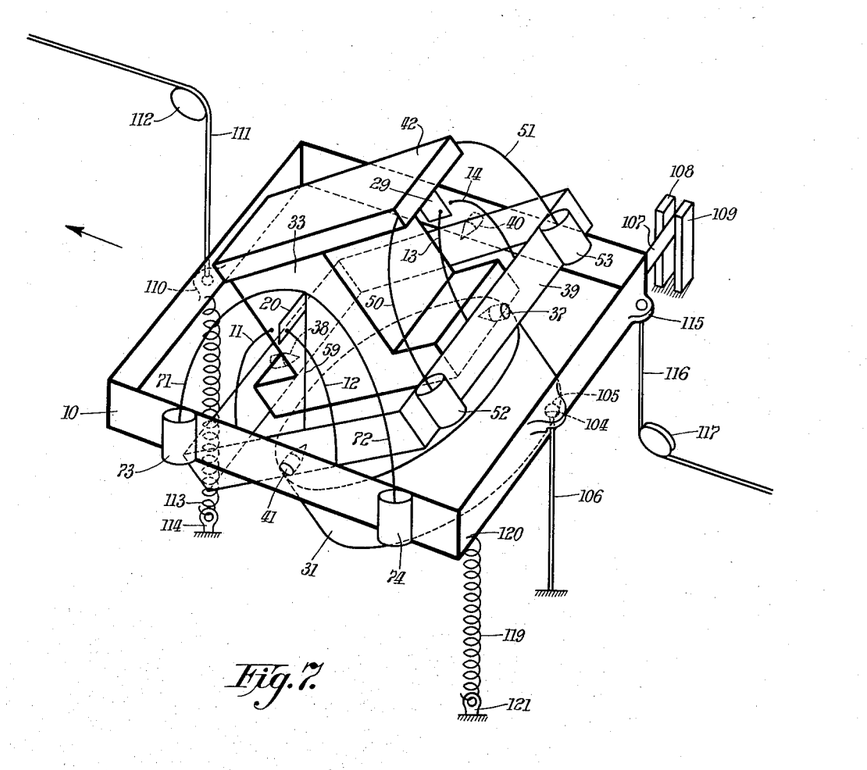
Fig. 7 is a schematic perspective view illustrating the instrument with the follow-up means attached thereto.

In order to prevent the present system from hunting, there has been provided a follow-up means for both the elevator as well as for the aileron actuating means. To effect a follow-up means, the main frame 10 is provided at its rearward portion with a ball pocket 104 adapted pivotally to receive a ball portion 105 provided on an upright pivot-rod 106 which is adapted to be fixed in a vertical position in the aircraft. Projecting horizontally from one side of the frame 10 is a guide rod 107 which is guided in a vertical direction by the upright guide members 108 and 109 which are adapted to be fixed in the aircraft. Secured to the forward portion of the frame 10, as at 110, is a cable 111 trained over the sundry guide pulleys 112 to be secured by a clamp 113 to cable 18. A coil spring 113 opposes the cable 111 and is connected to frame 10 at its upper end and to the aircraft at its lower end as at 114.

By reason of this construction, the operation of motor 15 to adjust the elevator 19, coincidently adjusts cable 111 and, in conjunction with spring 113, rocks the frame 10 about the transverse horizontal axis defined by the ball 105 and the guide 107, thereby causing the contacts 11 and 12 to move relatively to contact 20. The connections are such that this relative movement is in a direction to restore the contacts 11 and 12 to the relative positions they occupied prior to the starting of the motor 15; and the result is to bring about the opening of the control circuit, thereby stopping the motor 15 and arresting adjustment of the elevator 19, without waiting for those operations to be performed by the over-correction that would otherwise result. Thus, hunting is prevented in the elevator control system.

Secured as at 115 to the rear portion of the frame 10 is a cable 116 trained over sundry guide pulleys 117 throughout its length to be secured by a clamp 118 to the cable 27. Balancing the cable 116 is a coil spring 119 having its upper end secured to the rear portion of the frame 10, as at 120, and its lower end anchored as at 121 to the aircraft. Here, as in the case of the elevator follow-up control, the operation of motor 24 to adjust the aileron 28, coincidently adjusts cable 116 and, in conjunction with spring 119, rocks the frame 10 about the longitudinal axis defined by the ball 105 and the opposing cable 111 and spring 113 combination, thereby causing the contacts 13 and 14 to move relatively to contact 29. The connections here, as in the above case of the elevator, are such that this relative movement is in a direction to restore the contacts 13 and 14 to the relative positions they occupied prior to the starting of the motor 24; thereby bringing about the opening of the aileron control circuit to stop the motor 24. Thus, by means of these two follow-up systems the hunting effects normally present in such a control system are reduced to an unobjectionable minimum.

As hereinabove described, the present control system provides means whereby an aircraft may be automatically controlled about all three axes of angular motion; namely, lateral, longitudinal and directional.

The present invention also contemplates the provision of means on an instrument as above described such that the latter will be adapted to receive signals from an outside source for the purpose of utilizing the instrument as a servo means whereby said signals may be effective to control the flight of the aircraft. To this end the gyro unit is provided with the above described solenoid coils 52, 53, 73 and 74, as well as the cooperating cores 50, 51, 71 and 72.

Broadly, it is to be understood that the solenoids are so disposed that when they are energized they react upon the magnetic cores carried by the outer gimbal ring 39 and the inner gimbal ring 33 respectively. Thus, by energizing the different solenoids, various torques may be applied to the gyroscope and, therefore, by a proper application of torque the gyroscope may be made to precess in a direction such that the aircraft, through the medium of the electric pick-offs and servo-motors, will be directed through any normal maneuver. In this connection it is to be understood that in order to effect a fore and aft precessional movement of the gyro, it is necessary to apply a sidewise torque upon the gyro by means of coil 52 or 53. The choice of either coil 52 or 53 to be energized depends upon the direction of rotation of the gyro rotor 31 and whether it is desired to effect an upward or downward movement of the gyro. To effect a sidewise or an athwartships precessional movement of the gyro, it is necessary to apply torque in the fore and aft direction by means of coil 73 or 74.

For example, in the present form of the device, if it is desired to place the aircraft in a dive, it is merely necessary to energize coil 52 thereby to apply a sidewise torque upon the gyro which will force the same to precess in a forward direction about the axis defined by trunnions 40 and 41. This movement of the gyro will bring contact 20 into engagement with contact 11, thereby to close the elevator circuit and energize the motor 15 in a manner such that the elevator 19 will be adjusted downwardly in order to dive the aircraft. For turning or executing any such complicated maneuver, a combination of two solenoids may be energized thus to effect simultaneous control over the elevators and ailerons.

For thus energizing the solenoids, there is provided with the present instrument four normally open switches 122, 123, 124 and 125 which may be controlled directly and manually by a human airborne pilot or remotely from the ground by means of a radiant energy device. Each of these switches is adapted to close the circuit between a respective one of the solenoid coils 73, 74, 52 and 53 and the battery 22, thereby energizing the coil to effect a desired precession of the gyro to the end that the aircraft is maneuvered accordingly to the will of the human operator.

In order to prevent the gyro unit from precessing at a rate far in excess of the corresponding movement of the aircraft, there is provided in the system a normally closed magetic relay unit 126, which, when closed, connects one side of each of the coils 52, 53, 73 and 75 to one side of the battery 22, through a common lead 127. However, in the event that the aircraft does not respond to the precessional movement of the gyro at a rate corresponding thereto, either one of the contacts 20 or 29 will engage one of the cutout contacts 45, 66, 63 or 64, with the result that the relay 126 will be energized thus to open its switch member. Whenever the relay switch opens, the circuit between the solenoid coils and the battery is opened, thereby deenergizing the coils with the result that the precessional torque is removed from the gyro. This action will permit the aircraft to come into proper orientation relative to the gyro, and as soon as this occurs the cut-out switch circuit will be again broken, thereby permitting further precessional movement of the gyro if one of the controlling switches 122, 123, 124 or 125 is still closed.

It is thus to be understood that the present aircraft control system is designed in a manner such that the initial angular position of the aircraft relative to the gyro rotor is maintained substantially constant throughout all changes in attitude and direction of the aircraft. This is an important consideration as it makes it possible for the aircraft to perform various aerobatics through and under the control of the gyro system, a feature not possible in gyro-controlled automatic pilots heretofore used.

The present control system is also provided with means whereby the aircraft may be set on a predetermined course, such means being effective to maintain the aircraft on such course at all times until changed by either the airborne human pilot or by a ground operator through a radiant energy signaling device. These means comprise a compass or azimuthal directing means 128 for determining the course in azimuth, and a barometric control or elevational directing means 129, for determining the course in elevation. An airspeed responsive device 130 may, if desired, be used in conjunction with the barometric controller 129 for determining the course in elevation.

Referring to Fig. 1, compass 128 is shown diagrammatically as comprising a needle 130 floating between contacts 131 and 132. As contacts 131 and 132 are connected respectively to the coils 74 and 73, and the needle 130 is connected to battery 22, engagement of the needle with either of the contacts 131 or 132 will energize a respective one of the coils 74 or 73, to the end that the gyro will be made to precess to either port or starboard, depending upon the contact engaged. Thus the compass 128 is effective to control the aircraft in azimuth through the gyro unit.

The barometric controller 129 broadly comprises a pressure responsive diaphragm 133 which, subject to changes in atmospheric pressure, forces the floating contact 134 into engagement with either contact 135 or 136, depending upon whether the atmospheric pressure increases or decreases. As each of contacts 135 and 136 is connected to one side of a respective one of the solenoid coils 52 and 53, and the floating contact 134 is connected to the battery 22, engagement of contact 134 with either of contacts 135 or 136 will be effective to energize one of the coils 53 or 52, thereby causing the gyro rotor to precess forwardly or backwardly in the fore and aft direction. Thus, the barometric controller 129 is effective to keep the aircraft at any desired altitude. It is, of course, well known in the art that such compass and barometric controllers may be adjusted so that they may originate a preselected signal upon the divergence of the aircraft from any predetermined course.

The air-speed responsive device 130 is of the usual construction and it is adapted to originate a preselected signal upon any change in the air speed from the normal. Referring to Fig. 1, the device 130 is wired in parallel with the barometric controller 129 and, therefore, it is designed to cooperate with controller 129 in keeping the aircraft upon an even keel fore and aft and at a a constant altitude.

As is well known in the gyroscopic art, a gyroscope such as the present unit is subject to "drift" errors due to precession thereof occasioned by foreign torques set up by the bearing friction within the unit itself as well as by the earth's rotation. The rate of this precession, of course, varies with the amount of bearing friction and with the position of the instrument over the surface of the earth.

In order to overcome these "drift" errors the present system may be provided with the corrective means shown in Fig. 2 of the drawings. Broadly, this corrective means comprises devices which are effective to set up a selected counter torque upon the gyro rotor, which counter torque will be of such force and in such a direction as to balance out those foreign torques which would otherwise cause the gyro to drift as above described. Specifically, these means comprise four variable resistors 137, 138, 139 and 140, each of which is placed in series between the battery 22 and a respective one of the solenoid coils 73, 74, 52 and 53. Each resistor is provided with a respective one of the adjusting contacts 141, 142, 143 and 144. It is to be understood that by shifting any one of the adjusting contacts along its resistor, a torque of any predetermined desired intensity may be set up by a respective one of the solenoid coils, to the end that any observed "drift" inherent in the gyro rotor may be balanced out by applying a proper counter torque couple thereto.

Having thus set forth the nature of the invention, what I claim herein is:

1. A gyroscopic apparatus adapted for use in an aircraft having azimuthal and elevational controlling planes, comprising, a frame adapted to be carried in said aircraft, an outer gimbal ring pivotally mounted in said frame upon a transverse horizontal axis, an inner gimbal ring pivotally mounted in said outer ring upon an axis lying in the longitudinal vertical plane, a gyro rotor mounted in said inner ring, means initially to position the spin-axis of said gyro rotor in the longitudinal vertical plane of the aircraft and at an inclination with the horizontal plane, means responsive to any relative movements between said aircraft and said spin-axis for actuating said controlling planes, torque-applying means associated with said frame for applying a torque upon said outer gimbal ring, torque-applying means associated with said outer gimbal ring for applying a torque upon said inner gimbal ring, means for severally or jointly bringing said torque-applying means into operation, and follow-up control means for varying the position of said frame relative to said aircraft in response to movements of said controlling planes.

2. A gyroscopic apparatus adapted for use in an aircraft having ailerons and elevators, comprising, a frame adapted to be carried in said aircraft, an outer gimbal ring pivotally mounted in said frame upon a transverse horizontal axis, an inner gimbal ring pivotally mounted in said outer ring upon an axis lying in the longitudinal vertical plane, a gyro rotor mounted in said inner ring, means initially to position the spin-axis of said gyro rotor in the longitudinal vertical plane of the aircraft and at an inclination with the horizontal plane, means responsive to relative movements between said spin-axis and said outer ring for actuating said ailerons, means responsive to relative movements between said outer gimbal ring and said frame for actuating said elevators, torque-applying means associated with said frame for applying a torque upon said outer gimbal ring, torque-applying means associated with said outer gimbal ring for applying a torque upon said inner gimbal ring, means for severally or jointly bringing said torque-applying means into operation, and follow-up control means for varying the position of said frame relative to said aircraft in response to movements of said ailerons and elevators.

3. In a gyroscopic apparatus of the character described, having a gyro rotor mounted to rotate in an inner gimbal ring itself pivotally mounted in an outer gimbal ring which is pivotally carried in a frame member, the combination of a double-acting pick-off switch for detecting relative movement between said inner and outer gimbal rings, a second double-acting pick-off switch for detecting relative movement between said outer gimbal ring and said frame member, control means responsive to signals set up whenever said switches are closed by the relative movements between said frame member and said gimbal rings, and solenoid means selectively to apply a torque to said gimbal rings for precessing said gyro rotor in any desired direction.

4. In a gyroscopic apparatus of the character described having a gyro rotor mounted to rotate in an inner gimbal ring itself pivotally mounted in an outer gimbal ring which is pivotally carried in a frame member, the combination of a double-acting pick-off switch for detecting relative movement between said inner and outer gimbal rings, a second double-acting pick-off switch for detecting relative movement between said outer gimbal ring and said frame member, control means responsive to signals set up whenever said switches are closed by the relative movements between said frame member and said gimbal rings, and means selectively to apply a torque to said gimbal rings for precessing said gyro rotor in any desired direction, said last mentioned means comprising a pair of electro-magnetic devices of which each is associated with a respective one of said gimbal rings.

5. In a gyroscopic apparatus of the character described, having a gyro rotor mounted to rotate in an inner gimbal ring itself pivotally mounted in an outer gimbal ring which is pivotally carried in a frame member, the combination of a double-acting pick-off switch for detecting relative movement between said inner and outer gimbal rings, a second double-acting pick-off switch for detecting relative movement between said outer gimbal ring and said frame member, control means responsive to signals set up whenever said switches are closed by the relative movements between said frame member and said gimbal rings, solenoid means selectively to apply a torque to said gimbal rings for precessing said gyro rotor in any desired direction, and switch means associated with said apparatus for rendering said solenoid means ineffective whenever said gyro rotor forms a predetermined angle relative to either said outer gimbal ring or said frame member.

6. In a gyroscopic apparatus of the character described, a gyro rotor adapted to be positioned in an aircraft with its axis of spin disposed in a longitudinal vertical plane of the aircraft and canted forwardly with respect to the line of flight, inner and outer gimbal rings having pivot axes at right angles to each other and adapted for mounting in the aircraft with the pivot axis of one of the rings in said longitudinal vertical plane and the pivot axis of the other ring normal to such plane, a double-acting pick-off switch for detecting relative movement between said inner and outer gimbal rings, a second double-acting pick-off switch for detecting relative movement between said outer gimbal ring and said aircraft, aircraft directional control means responsive to signals set up whenever said switches are closed by the relative movements between said aircraft and said gimbal rings, and solenoid means selectively to apply a torque to said gimbal rings for precessing said gyro rotor in any desired direction.

7. In a gyroscopic apparatus of the character described, a gyro rotor adapted to be positioned in an aircraft with its axis of spin disposed in a longitudinal vertical plane of the aircraft and canted forwardly with respect to the line of flight, inner and outer gimbal rings having pivot axes at right angles to each other and adapted for mounting in the aircraft with the pivot axis of one of the rings in said longitudinal vertical plane and the pivot axis of the other ring normal to such plane, a pair of double-acting pick-off switches directly associated with said gimbal rings and adapted to detect relative movement between said gyro rotor and the aircraft, aircraft directional control means responsive to signals set up whenever said switches are closed by the relative movements between said aircraft and said gyro rotor, and means selectively to apply a torque to said gimbal rings for precessing said gyro rotor in any desired direction, said last mentioned means comprising two pair of solenoids each pair being associated directly with a respective one of said gimbal rings.

EDGAR P. TURNER.

REFERENCES CITED

The following references are of record in the file of this patent:

UNITED STATES PATENTS

| Number | Name | Date |
| --- | --- | --- |
| 1,825,994 | Cooke | Oct. 6, 1931 |
| 1,826,013 | Meredith | Oct. 6, 1931 |
| 1,942,470 | Bossett | Jan. 9, 1934 |
| 2,146,620 | Brown et al. | Feb. 7, 1939 |
| 2,286,561 | Meredith | June 16, 1942 |